June 27, 1933.    C. RATCLIFF ET AL    1,915,474
VEHICLE INDEPENDENT WHEEL SUSPENSION
Filed Jan. 21, 1933    2 Sheets-Sheet 1

Inventors
CLAUDE RATCLIFF
WILLIAM DELBERT RATCLIFF
By
Attorney

June 27, 1933. C. RATCLIFF ET AL 1,915,474
VEHICLE INDEPENDENT WHEEL SUSPENSION
Filed Jan. 21, 1933   2 Sheets-Sheet 2
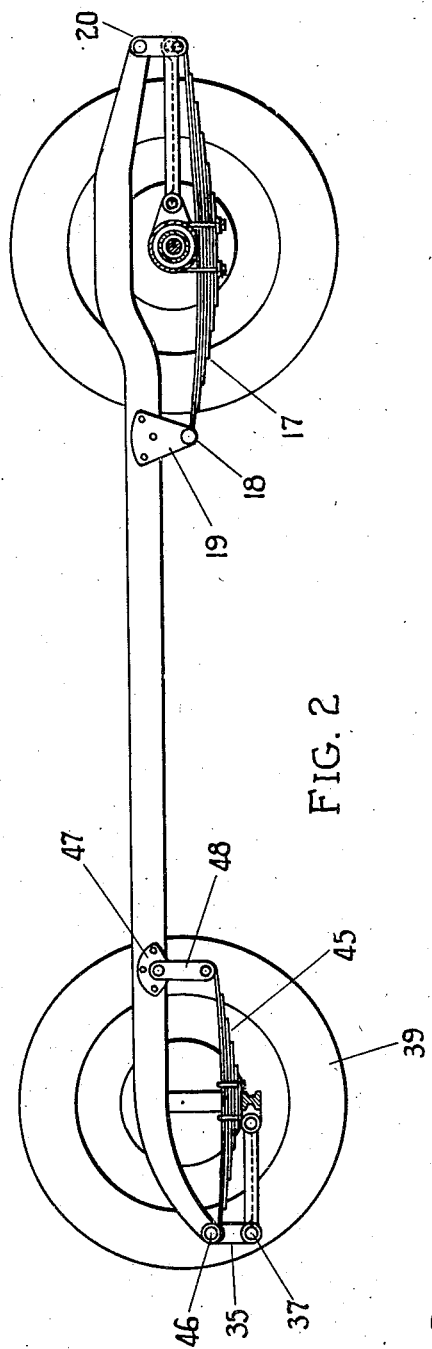
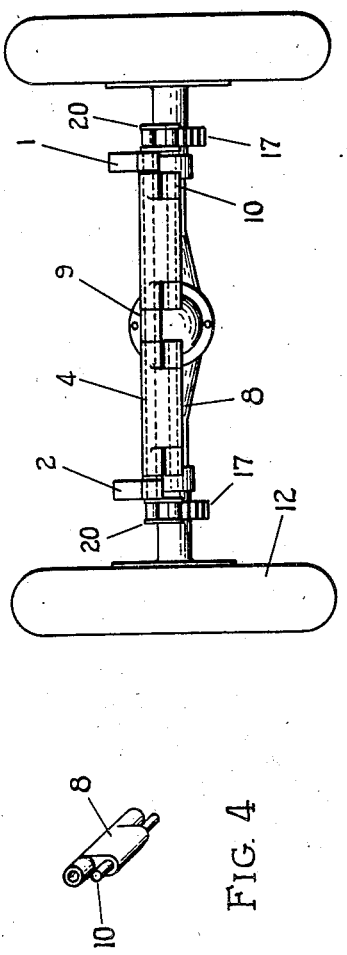
Inventors
CLAUDE RATCLIFF
WILLIAM DELBERT RATCLIFF
By Owen H. Spencer
Attorney Patented June 27, 1933

1,915,474

UNITED STATES PATENT OFFICE

CLAUDE RATCLIFF AND WILLIAM DELBERT RATCLIFF, OF KINGHAM, INDIANA

VEHICLE INDEPENDENT WHEEL SUSPENSION

Application filed January 21, 1933. Serial No. 652,856.

The invention relates to vehicle axle constructions, and more particularly to axle mechanisms which permit independent vertical movement of the vehicle wheels in relation to the respective adjacent vehicle portions, and the invention is more especially constructed for automobiles and motor driven trucks; and the novelty and usefulness thereof resides as hereinafter set forth and pointed out more particularly in the claims.

A fundamental object of the invention is to provide an independent axle means for each vehicle wheel by which the vertical movement of any one wheel will not influence the position of any of the other wheels.

It is a primary object to construct apparatus of this class which may be readily embodied with standard vehicle spring and shackle supports, giving the wheel spindles freedom of the usual movements as controlled by the vehicle springs and shackles.

It is an important object to provide a flexibly constructed and supported propulsion axle mechanism unitarily with the driving means therefor by which arrangement said mechanism and means yield compensatingly with the change in vertical height of the traction wheels of the vehicle.

It is a further object to provide, in conjunction with vehicle driving wheels independently controlled as to position, wheel driving spindles which follow said wheels in respect to position, power transmitting axle means flexibly and slidably connected to said spindles, floatingly controlled journals for said spindles, housing structure for said axle means, one end of which is flexibly and slidably supported by each of said journals, a propelling shaft, one end of which is geared to said axle means and the other end of which is flexibly connected to the main motion transmitting parts of the vehicle, and a housing for said propelling shaft rigidly secured to the axle housing; whereby a three point suspension is provided for the propelling shaft and power transmitting axle means.

The above and other objects are attained by the structure illustrated in the accompanying drawings, in which:

Fig. 2, is a fragmentary section on line 2—2 of Fig. 1;

Fig. 3 is a rear elevation of Fig. 1; and

Fig. 4 is a perspective detail view of one of the suspension shackles.

Figure 1:
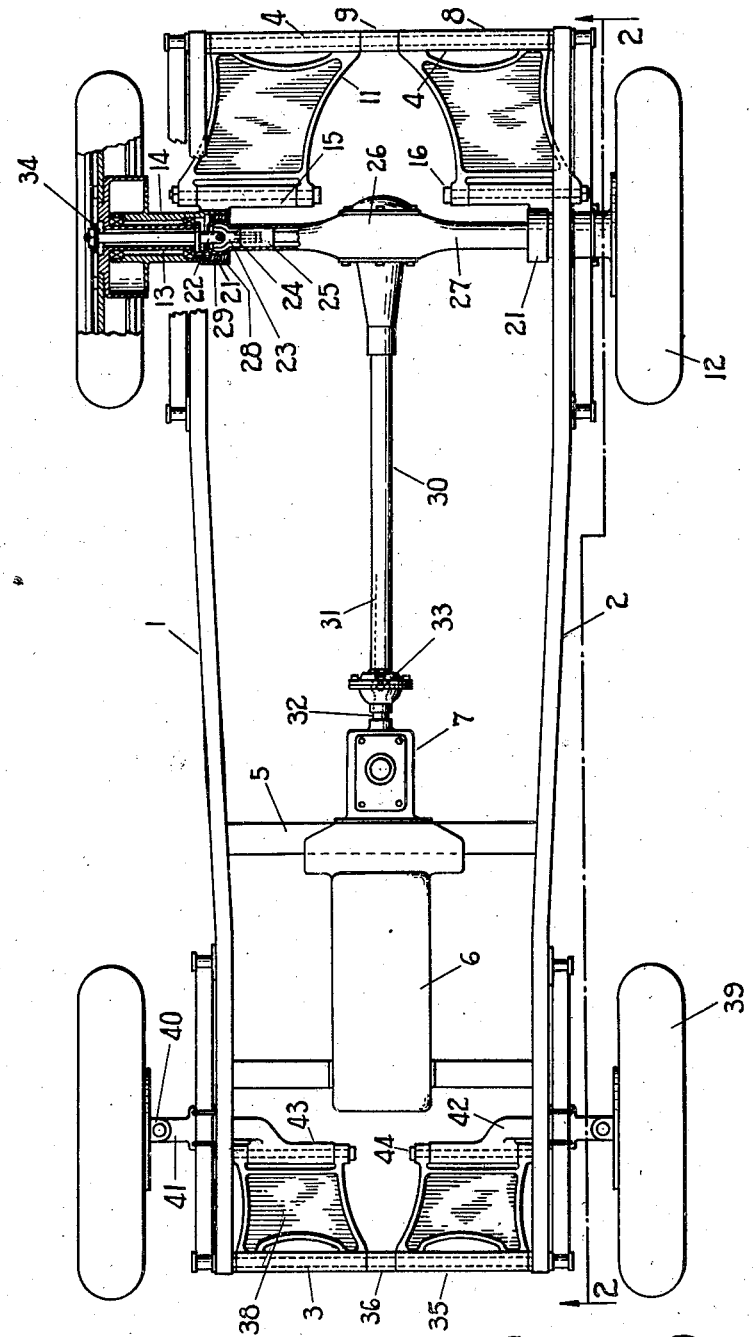
Figure 1, is a diagrammatic plan view illustrating the invention embodied with a somewhat typical automobile chassis.

Similar characters of reference designate similar elements throughout the different views. Referring to Fig. 1, the numerals 1 and 2 designate the side rails of the vehicle chassis, which are conveniently of conventional channel iron character, having their open sides toward each other, and are arranged somewhat lengthwise with the vehicle. The numeral 3 designates a slender cylindrical member which connects the extreme forward ends of said side rails, and the numeral 4 designates another such cylindrical member which likewise connects the extreme rearward ends of said side rails. The structural cross member 5, connects said side rails at a point between the vehicle propulsion engine 6, and the usual automobile transmission 7, which is supported by said cross member.

Referring especially to Fig. 3, it will be observed that the pair of shackles 8, are pivoted by and suspend from the cylindrical member, 4. Said shackles are comparatively wide and occupy the member 4, for considerable distance from the respective side rails to the spacer 9, which is disposed about said member between said shackles so as to confine same longitudinally of said member. A pair of co-aligned trunnions 10, project from each of said shackles in opposite directions, substantially beneath and parallel to the cylindrical member 4. A pair of approximately horizontal struts 11 are pivoted, one to each of said shackles by said trunnions, and extend forwardly therefrom. In this example of the invention the rearward wheels 12, of the vehicle are the traction or driving wheels, and are integrally mounted upon the inwardly extending hollow spindles 13. Said spindles are journaled in the bearings 14. One of the rearwardly disposed horizontal cylindrical bosses 15, is integrally united with each of said bearings parallel thereto, and a horizontal pivot shaft 16 engages each of said bosses, extending through and beyond same on opposite sides thereof, and the forward ends of the struts 11, straddle said bosses, respectively, and are pivoted thereto by the extending portions of said pivot shafts.

From the foregoing it will be understood that the wheel spindles 13, are kept in substantially horizontal position by the chassis member 4, through the shackles 8, the struts 11, and the bearings 14, the member 4, trunnions 10, pivot pins 16, and spindles 13, being parallel to each other, by which arrangement the working position of the driving wheels 12 is maintained while permitting the height of said wheels to vary in relation to the respective side rail 1 or 2. Referring more particularly to Fig. 2, it will be observed that the bearings 14 are midway points of the regular rearward vehicle springs 17. By means of the pivot bolts 18, the forward ends of said springs are pivoted to the side rails, 1 and 2, and lowerly thereof by the pivot bracket 19, which are fixed to said frame, the rearward end of said spring being shackled under the corresponding rearward ends of said side rails, and to same by standard shackle connections 20. As will be understood by those familiar with the art, the rearward share of the sprung weight of the vehicle is borne by the driving wheels 12, the spindles 13, the bearings 14, the springs 17, spring pivot and shackle connections 18 and 20, and the side rails 1 and 2. It will also be understood that the normal flexure of the spring 17 in carrying varying weight loads over irregular road surfaces causes the bearings 14 to be swung through a somewhat arcual path about the spring pivot 18, causing a slight forward and rearward shifting of said bearings with the struts 11, the shackles 8 correspondingly swinging forwardly and rearwardly to permit free operation of said springs, and freedom of corresponding movement of said bearings as controlled by said springs.

The inner ends of said bearings form counterbored portions 21, the inner diameter of each being in excess of the spindles 13, but concentric therewith. Said spindles terminate inwardly in the form of universal joint connections 22, disposed within the bearing portions 21 and spaced from the inner wall surface thereof. Companion universal joint connections 23, are interlocked with the connections 22 in a typical manner and any form of commercial universal joint may be substituted. Said companion connections are integrally united with inwardly extending spindle drivers 24, which extend further inwardly in the form of longitudinally splined shafts, which in this example of the invention serve as splined male parts which are telescoped by and slidably engage the co-aligned female splined sleeves 25. Said sleeves extend to driven relation with the ordinary differential axle gearing 26.

The universal joint connections 22 and 23, the spindle drivers 24, splined sleeves 25 and the differential gearing 26 are embodied with and enclosed within the elongated axle housing 27. The ends of said housing terminate within the counterbored portions 21 of the bearings in spherical wall foundations 28, said spherical wall formations being spaced from the wall structure of said counterbored portions and from the universal joint connections 22 and 23, within which same are disposed. Said spherical wall formations are surrounded by the bushings 29, the inner surface of which conforms to and slidably engages the outer spherical surfaces of said spherical formations, and the outer surface of which slidably engages the inner diametrical surface of said counterbored bearing portions. The propeller shaft housing 30 is rigidly secured to the axle housing at a midway point thereof and extends forwardly therefrom. The propeller shaft 31 extends from without the forward end of said propeller shaft housing to the differential gearing 26 and drives same through conventional gearing, not shown. The forward end of said propeller shaft is coupled with the rearwardly exposed shaft 32 of the ordinary automobile transmission 7 by means of the universal joint 33. From the foregoing, it will be understood that the universal joint 33 and spherical ends 28 of the axle housing 27, form a compensating three point suspension for said axle and propeller shaft housings, readily allowing for the unitary shifting of said housings and parts embodied therein at varying relative heights of the driving wheels. It will be further understood that the variation of distance between the bearings 14, due to the variety of positions of said wheels is compensated for by the sliding of the bushings 29 in the enlarged portions 21 of said bearings, said bushings following the spherical axle housing portions 28 and rotating on same as said axle housing and bearings weave into varying angular relation, it being obvious that the universal joint connections 22 and 23 flex correspondingly, that the splined spindle drivers 24 slide in the sleeves 25 accordingly, and that a flexible driving means is comprised for said driving wheels through the spindles 13, said universal joint connections, said spindle drivers, said sleeves, the axle gearing 26, the propeller shaft 31, the universal joint 33, and transmission shaft 32, said spindles being keyed to said driving wheels by key means 34.

As indicated in Fig. 1, another pair of shackles 35, similar to the shackles 8, are pivoted on and suspended from the cylindrical chassis member 3, the spacer 36 being strung on said member between said shackles to confine each to the respective side rail 1 or 2, in the manner of the spacer 9. A pair of co-aligned trunnions 37 project from each of said other shackles in opposite directions, disposed like the trunnions 10, parallel to the member 3. A pair of approximately horizontal struts 38 are pivoted one to each of said other shackles by said trunnions, and extend rearwardly therefrom. The forward wheels 39 of the vehicle are the steering wheels, and are axially confined on the steering spindles, 40. Said steering spindles are conventionally pivoted by the steering knuckles 41 to the co-aligned axle sections 42. One of the forwardly disposed horizontal cylindrical bosses 43 is integrally united with each of said bearings, parallel thereto, and a horizontal pivot shaft 44 engages each of said bosses, extending through and beyond same on opposite sides thereof, and the rearward ends of the struts 38, straddle said bosses, respectively, and are pivoted thereto by the extending portions of said pivot shafts.

From the foregoing it will be understood that the axle sections 42, are kept in substantially horizontal position by the chassis member 3, through the shackles 35, the struts 38, and the bosses 43, the member 3, shackles 38, pivot shafts 44, and sections 42, being parallel to each other by which arrangement the working position of said axle sections is maintained while permitting the height of the steering wheels 39 to vary in relation to the respective side rail 1 or 2. Referring more particularly to Fig. 2, it will be observed that said axle sections are cleated to midway points of the ordinary front vehicle springs 45. By means of the pivot bolts 46 the forward ends of said springs are pivoted to the side rails, 1 and 2, and lowerly thereof, at the pivot brackets 47, which are fixed to said frame, the rearward ends of said springs are shackled under the corresponding parts of said side rails, and to said brackets by standard shackle connections 48. The forward share of the sprung weight of the vehicle is therefore borne by the steering wheels 39, the steering spindles 40, the knuckles 41, the axle sections 42, the springs 45, the spring bolts and shackle connections 46 and 48, and the side rails 1 and 2. It will also be understood that the normal flexure of the spring 45, in carrying varying weight loads over irregular road surfaces causes the axle sections 42 to be swung through an arcual path about the spring bolt 46, causing a slight forward and rearward shifting of said sections with the struts 38, the shackles 35, correspondingly swinging forwardly and rearwardly to permit free operation of said springs, and freedom of corresponding movement of each of said bearings as controlled by said springs.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

The invention claimed is:

1. A vehicle suspension comprising independent spring supporting wheel spindles, vehicle springs mounted thereon, pivot and shackle means mounting the vehicle proper on said springs, substantially horizontal struts hinged to said spindles on a substantially horizontal axis, substantially vertical shackles hinged to said vehicle proper and to said struts, upon substantially horizontal axes, said struts and shackles serving to maintain the uprightness of said wheels and together yielding to the lateral shifting of said spindles in all directions, independently of each other.

2. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently of each other.

3. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently of each other; motion transmitting means for said spindle, flexible joints serving to carry said motion transmitting means with said spindles, said joints serving to yield during angular variations in the relation of said transmitting means and spindles.

4. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently of each other, motion transmitting means for said spindles, flexible joints serving to carry said motion transmitting means with said spindles, said joints serving to yield during angular variations in the relation of said transmitting means and spindles, a wheel driving mechanism, slidably keyed shaft parts through which said transmitting means are rotated by said wheel driving mechanism, said shaft parts serving to automatically lap a more or less amount during said angular variations.

5. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently of each other, motion transmitting means for said spindles, flexible joints serving to convert said motion transmitting means with said spindles, said joints serving to yield during angular variations in the relation of said transmitting means and spindles, a housing enclosing and embodied with said wheel driving mechanism, said housing being flexibly united with said bearings.

6. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently f each other, motion transmitting means for said spindles, flexible joints serving to carry said motion transmitting means with said spindles, said joints serving to yield during angular variations in the relation of said transmitting means and spindles, a wheel driving mechanism, slidably keyed shaft parts through which said transmitting means are rotated by said wheel driving mechanism, said shaft parts serving to automatically lap a more or less amount during said angular variations, a housing enclosing and embodied with said wheel driving mechanism, said housing being flexibly and slidably united with said bearings.

7. A vehicle suspension and driving mechanism comprising independent spring supporting wheel spindles, bearings serving to journal said spindles, vehicle springs mounted thereon, a pivot and shackle means mounting the vehicle proper on said springs, substantially horizontal struts hinged to said bearings on a substantially horizontal axis, substantially vertical shackles hinged to said vehicle proper and to said struts, upon substantially horizontal axes, said struts and shackles serving to maintain the horizontalness of said spindles and together yield to the lateral shifting of said spindles in all directions, independently of each other, motion transmitting means for said spindles, flexible joints serving to convert said motion transmitting means with said spindles, said joints serving to yield during angular variations in the relation of said transmitting means and spindles, a housing enclosing and embodied with said wheel driving mechanism, said housing being flexibly united with said bearings, a propeller shaft casing rigidly secured to said housing, a propeller shaft serving to drive said wheel driving mechanism, one end of said propeller shaft being flexibly connected to other driving parts of the vehicle.

In testimony whereof, we have hereunto set our hands, this 29th day of December, 1932.

CLAUDE RATCLIFF.
WILLIAM DELBERT RATCLIFF.